Oct. 19, 1943.   Z. J. ATLEE ET AL   2,332,427
X-RAY APPARATUS
Original Filed Jan. 8, 1941
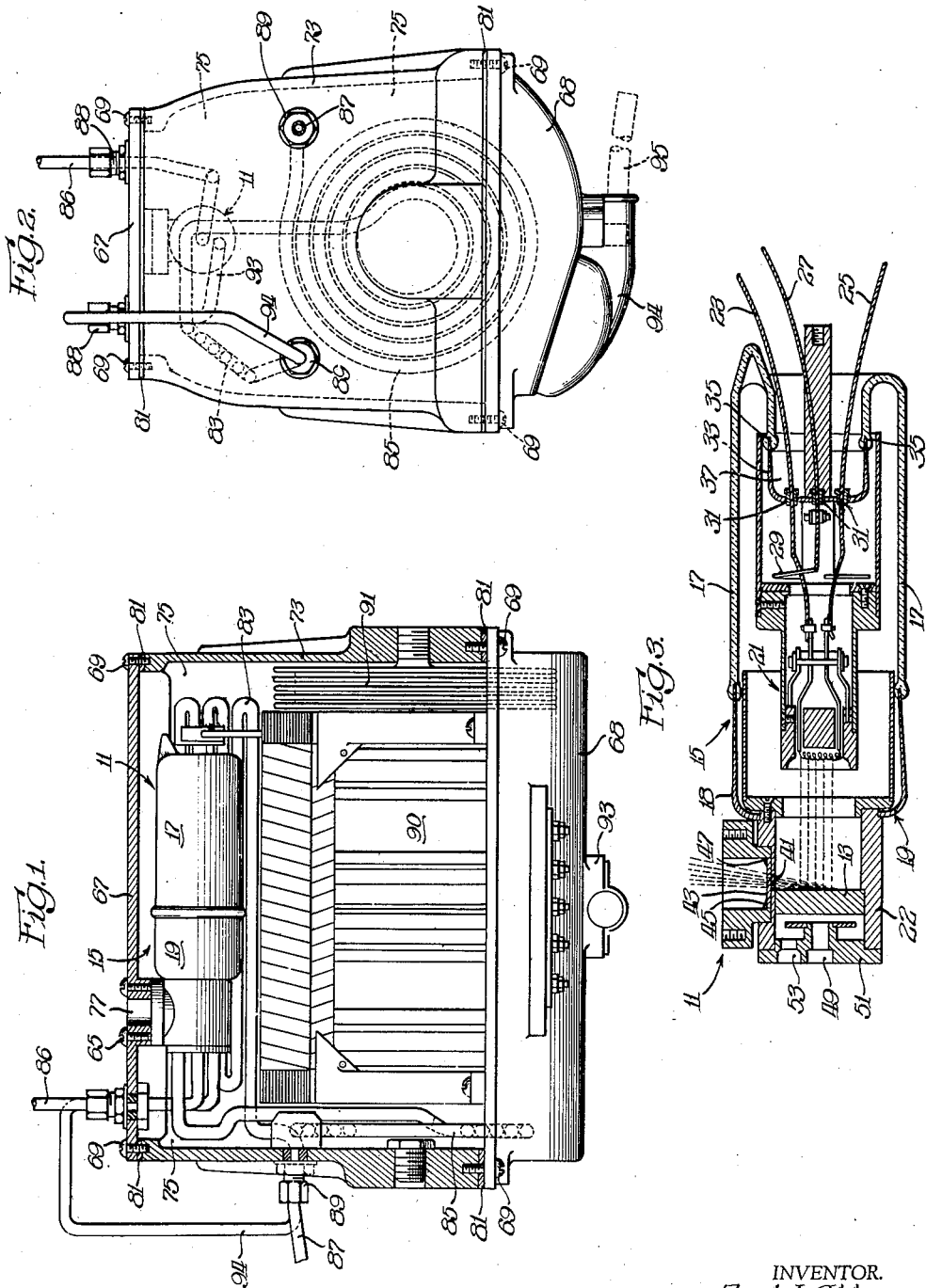
INVENTOR.
Zed J. Atlee
Howard Brackney
BY
Spencer Marzall Johnston & Cook
Attys.

Patented Oct. 19, 1943

2,332,427

UNITED STATES PATENT OFFICE 2,332,427

X-RAY APPARATUS

Zed J. Atlee, Elmhurst, and Howard Brackney, Chicago, Ill., assignors to General Electric X-Ray Corporation, Chicago, Ill., a corporation of New York Original application January 8, 1941, Serial No. 373,630. Divided and this application May 7, 1941, Serial No. 392,358

3 Claims. (Cl. 250—89)

This invention relates to X-ray apparatus and has more particular reference to a casing enclosed X-ray tube or generator, the same comprising subject-matter divided from the co-pending application Serial No. 373,630, filed January 8, 1941, upon which United States Letters Patent No. 2,310,567 issued February 9, 1943.

An important object of the invention is to provide a housing for an X-ray generator having a removable cover on which the generator is secured for suspension in the housing, whereby to facilitate removal of the generator for inspection, repair or replacement; a further object being to form the cover with a generator mounting forming a window and to provide for securing the generator on the cover at said mounting.

A further object is to provide a housing in which an X-ray generator may be enclosed in position submerged in a cooling and insulating fluid in the housing; a further object being to form the generator with means for circulating a cooling fluid in direct contact with its anode; a still further object being to provide the housing with cooling coils extending therein in heat exchange relationship with respect to the cooling fluid in the vicinity of the mounted generator.

These and numerous other important objects, advantages, and inherent functions of the invention will become apparent as the invention is more fully understood from the following description, which, taken in conjunction with the accompanying drawing, discloses a preferred embodiment of the invention.

Referring to the drawing:

Figure 1 is a sectional view of the self-contained portable X-ray apparatus, having a casing and enclosed X-ray generator formed and arranged in accordance with the present invention;

Figure 2 is an end view of the apparatus shown in Figure 1; and

Figure 3 is an enlarged sectional view of the X-ray generator forming a part of the assembly shown in Figure 1.

To illustrate the invention, the drawing shows an X-ray generator 11 enclosed in a housing which, as shown, comprises a shell 73 forming integral side and end walls and fitted with top and bottom closures 67 and 68 suitably secured in seats formed on the shell member 73, the covers 67 and 68 being held in place, as by holding screws 69, and sealed to the shell member 73 by means of suitable gaskets 81. The shell 73 and cover means 67 and 68 may be formed of any suitable material, and the X-ray generator 11 is mounted on the cover 67 as by means of the screws 65. The shell 73 and covers 67 and 68 enclose a chamber 75 which contains a suitable cooling fluid, such as oil, in which the generator 11 immerses.

While the invention is not necessarily limited to the particular form and construction of the generator 11, the same, as shown, comprises an anode or target 13 of any suitable material, such as copper, iron, or nickel cast in copper, which is supported within a sealed envelope 15 comprising a hard glass portion 17 and a metal portion 19 which may be of cold rolled steel.

The generator comprises cathode means 21 supported within the envelope and provided with conductors 23 and 25 for energizing the same from a suitable electrical power source. A conductor 27 also may be provided in order to supply electrical energy to a getter wire 29 arranged within the cathode structure, and all of these conductors 23, 25 and 27 extend through vacuum-tight joints 31 formed in a cup-shaped member 33 which is sealed at its edges, as at 35, in an opening at one end of the glass envelope portion 17, the member 33 serving as a mounting for supporting the cathode 21 in place within the envelope. It will be noted that the cathode structure is in thermal contact with the member 33, which is preferably formed of metal and which has a surface in position to make thermal contact with the cooling fluid in which the generator is immersed, the cooling fluid circulating in the chamber 37 defined by the member 33 at the end of the envelope.

The metal portion of the envelope comprises a cylindrical shell 18, which is sealed at one end to the glass envelope portion 17. At its other end, the shell 18 is sealed to a cylindrical member 22 within which is mounted the target member 13, the edges of which are hermetically sealed in the channel of the member 22. The outer end of the member 22 is fitted with a cover plate 51 having openings 49 and 53 for connection with a source of cooling fluid, such as water, which may be circulated through the plate 51 into direct heat exchange contact with the back of the target member 13.

When the cathode 21 is energized, it becomes a source of electrons, which are caused to impinge upon the target 13 for the generation of X-rays which pass through a small port 41 formed in the cylindrical envelope member 22 and then through a vacuum-tight beryllium window 43 which is brazed or soldered in a collar 45, as indicated at 47. This collar, in turn, is sealingly secured in a socket formed in the envelope portion 22 at the port 41. The useful X-ray beam passing through the port 41 and the window 43 is preferably taken off at an angle of the order of four to eight degrees with respect to the target 13.

The X-ray generator, according to the present invention, is mounted on the cover plate 67 of the housing, the cover plate, to this end, being formed with an embossment defining an opening 77, and the generator is secured on the embossment with the beryllium window 43 in line with the opening 77, the collar, to this end, being formed with threaded openings for the reception of the holding screws 65. The beryllium window 43 is thus disposed at the bottom of a pocket or well opening outwardly of the casing, so that X-rays passing through the window are immediately projected outwardly of the casing and are not required to penetrate the circulating oil in which the tube is immersed. Thus, the presence of oil surrounding the X-ray tube is not permitted to have any X-ray absorbing effect.

A cooling fluid may be supplied from a suitable external source directly to the target 13, as by conduit means 86 extending through the walls of the casing and preferably sealed by a gland 88 in the cover, said conduit means connecting with the opening 49 and passing into contact with the target 13 and thence through the outlet 53 which is connected with conduit means 93. The conduit means 93 also preferably passes outwardly of the casing through a gland 88 in the cover 67 and is connected, by a pipe 94, with a gland 89 in the wall of the housing 73, which gland forms the inlet to a series of cooling coils disposed within the housing, including coils 83 disposed directly alongside of the generator 11 and coils 85 at one end of the housing adjacent a transformer 90, the cooling fluid being discharged through an outlet pipe 87 having a gland or fitting 89 in an end wall of the shell 73.

One of the advantages of the invention is that the cooling fluid circulated in the pipes 83, 85, 86, 87 and 93 may be ordinary tap water. The cooling coils 83 and 85 preferably comprise copper pipe immersed in the oil in the chamber 75 and permanently assembled in the casing 73, being secured thereto by the glands 89. The coil 85 serves to cool the transformer 90 for continuous operation, while the coil 83 aids in cooling the tube 11. Both coils cool the oil in the casing. A bellows 91 for maintaining the chamber 75 full of oil may be arranged within the housing at the end of the transformer 90 opposite from the coil 85.

It will be noted that the conduit means 86 and 93, leading to and from the tube 11, are also anchored on the cover 67 by the glands 88 so that, to remove the cover, it is merely necessary to disconnect the pipe 94 and remove the screws 69.

One of the important advantages of the construction shown in Figures 1 and 2 is that the distance between the target or anode and a crystal or other substance, which is to be subjected to X-rays for diffraction pattern examination, is extremely short, due to the fact that the window 43 is in the outer wall of the X-ray generator. Furthermore, the loss of X-rays, due to absorption, is reduced to a minimum, since beryllium has an extremely low coefficient of absorption, and X-rays emitted through the channel 77 avoid passage through the cooling fluid in the chamber 75.

The apparatus shown makes it possible to materially reduce the distance between the X-ray source on the target 13 and the material to be examined. This is an important improvement in view of the fact that X-ray intensity varies as the inverse square of the distance from the X-ray source.

The cover 68 may be formed as a mounting for the transformer 90, which may be secured thereon as by suitable bolts, and the cover 68 is also preferably formed with an integral housing 94 forming a sealed opening for a cable 95, by means of which electrical energy from an external power source may be supplied to the transformer. The transformer thus is mounted on the cover 68 and is removable from the casing therewith.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. X-ray apparatus comprising means forming a housing having a removable cover, an X-ray generator rigidly fastened on said cover, said generator having a target and a chamber adjacent said target, and conduit means secured to and opening outwardly of said cover and connected with said chamber for circulating a cooling medium from an external source through said chamber in heat exchange relationship with respect to said target, whereby said generator and conduit means may be assembled in and removed from said housing as a unit with said cover.

2. X-ray apparatus comprising means forming a housing having a removable cover, an X-ray generator rigidly fastened on said cover, said generator having a target and a chamber adjacent said target, conduit means secured to and opening outwardly of said cover and connected with said chamber for circulating a cooling medium from an external source through said cover in heat exchange relationship with respect to said target and thence outwardly through said cover, cooling coils in said housing, including a coil extending laterally adjacent said generator, duct means connected with said cooling coils and extending outwardly of the housing through a wall thereof, and means to detachably connect said duct means with said conduit means outwardly of the housing for the circulation of the cooling medium through said coils.

3. X-ray apparatus comprising means forming a housing having a removable cover, an X-ray generator rigidly fastened on said cover, said generator comprising a cathode structure, including a support member of heat conducting material exposed outwardly of said generator, and an anode portion, said generator being immersed in a cooling fluid in said housing and having direct access for circulation in heat exchange relationship with respect to the exposed portions of said cathode structure, and conduit means extending through said cover to circulate an additional cooling liquid from outside of the housing to the anode of said generator and return the additional cooling liquid outwardly of the housing for recirculation.

4. X-ray apparatus comprising a housing having a pair of removable covers, an X-ray generator rigidly fastened on one of said covers comprising a generator support cover adapted to enclose the generator in said housing, conduit means on and extending through sealed openings in said generator support cover for circulating a cooling fluid to and returning said fluid from the generator, and power delivery means for said generator supported on the other cover in position enclosed within said housing, whereby said conduit means and the generator may be removed from said housing with the generator support cover without disturbing the power delivery means, while the power delivery means may be removed from the housing with the cover on which it is mounted without interfering with the generator and conduit means.

5. X-ray apparatus comprising a housing having a pair of removable covers, and X-ray generator unit rigidly fastened on one of said covers in position enclosed thereby in said housing, and a power delivery unit for said generator unit supported on the other cover in position enclosed within said housing, whereby said generator and power delivery units may be removed each from said housing with the cover on which mounted without disturbing the other unit, including conduit means within the housing for circulating a cooling medium from an external source in heat exchange relationship with respect to the generator and power delivery units, said conduit means including pipe means extending through one of said covers and sealingly fastened thereto.

6. X-ray apparatus comprising a housing having a pair of removable covers, an X-ray generator unit rigidly fastened on one of said covers in position enclosed thereby in said housing, and a power delivery unit for said generator unit supported on the other cover in position enclosed within said housing, whereby said generator and power delivery units may be removed each from said housing with the cover on which mounted without disturbing the other unit, including conduit means within the housing for circulating a cooling medium from an external source in heat exchange relationship with respect to the generator and power delivery units, said conduit means including pipe means extending through one of said covers and sealingly fastened thereto, and pipe means extending through and sealed in the wall of said housing.

7. X-ray apparatus comprising a housing having a pair of removable covers, an X-ray generator unit rigidly fastened on one of said covers in position enclosed thereby in said housing, and a power delivery unit for said generator unit supported on the other cover in position enclosed within said housing, whereby said generator and power delivery units may be removed each from said housing with the cover on which mounted without disturbing the other unit, including conduit means within the housing for circulating a cooling medium from an external source in heat exchange relationship with respect to the generator and power delivery units, said conduit means including pipe means extending through one of said covers and sealingly fastened thereto, pipe means extending through and sealed in the wall of said housing, and a detachable jumper pipe for connecting said cover and housing-mounted pipe means outwardly of said housing.

8. X-ray apparatus comprising means forming a housing having a removable cover, an X-ray generator rigidly fastened on said cover, said generator having a target and a chamber adjacent said target, and conduit means secured to and opening outwardly of said cover and connected with said chamber for circulating a cooling medium from an external source through said chamber in heat exchange relation with respect to said target and in spaced relation therewith and so arranged as not substantially to obstruct the flow of X-rays from said target.

ZED J. ATLEE.
HOWARD BRACKNEY.